United States Patent
Noh et al.

(10) Patent No.: US 8,364,086 B2
(45) Date of Patent: Jan. 29, 2013

(54) METHOD OF CYCLIC DELAY DIVERSITY WITH THE OPTIMAL CYCLIC DELAY VALUE, AND TRANSMITTER PERFORMING THE SAME

(75) Inventors: Taegyun Noh, Daejeon (KR); Byung Jang Jeong, Daejeon (KR); Hyun Kyu Chung, Daejeon (KR); Dae Woon Lim, Seoul (KR); Min Joong Lim, Seoul (KR); Ho Yun Kim, Seoul (KR); Yong June Kim, Seoul (KR)

(73) Assignees: Electronics and Telecommunications Research Institute, Daejeon (KR); Dongguk University Industry-Academic Cooperation Foundation, Seoul (KR)

( * ) Notice: Subject to any disclaimer, the term of this patent is extended or adjusted under 35 U.S.C. 154(b) by 260 days.

(21) Appl. No.: 12/741,952

(22) PCT Filed: Jun. 30, 2008

(86) PCT No.: PCT/KR2008/003812
§ 371 (c)(1),
(2), (4) Date: May 7, 2010

(87) PCT Pub. No.: WO2009/061061
PCT Pub. Date: May 14, 2009

(65) Prior Publication Data
US 2010/0248634 A1 Sep. 30, 2010

(30) Foreign Application Priority Data

Nov. 8, 2007 (KR) .................. 10-2007-0113568

(51) Int. Cl.
*H04B 1/00* (2006.01)
*H04B 15/00* (2006.01)

(52) U.S. Cl. ............... 455/63.1; 455/67.13; 455/101; 370/329; 370/334; 375/267; 375/299

(58) Field of Classification Search ............. 455/63.1, 455/67.13, 101, 226.3, 232.1, 423, 450, 464; 370/329, 334; 375/267, 299
See application file for complete search history.

(56) References Cited

U.S. PATENT DOCUMENTS
(Continued)

FOREIGN PATENT DOCUMENTS

| KR | 1020060035939 | 4/2006 |
|----|---------------|--------|
| KR | 1020070043964 | 4/2007 |

(Continued)

OTHER PUBLICATIONS

Bauch, Gerhard et al., "Orthogonal Frequency Division Multiple Access with Cyclic Delay Diversity," ITG Workshop on Smart Antennas, pp. 17-24 (2004).

Khan, Farooq et al., "An Adaptive Cyclic Delay Diversity Technique for Beyond 3G/4G Wireless Network," IEEE 64th Vehicular Technology Conference, pp. 1-6 (2006).

(Continued)

*Primary Examiner* — Tuan H Nguyen
(74) *Attorney, Agent, or Firm* — Nelson Mullins Riley & Scarborough LLP; EuiHoon Lee, Esq.

(57) ABSTRACT

Disclosed are an apparatus and method of determining an optimal cyclic delay value. The method of determining the optimal cyclic delay value includes determining a Signal-to-Interference and Noise Ratio (SINR) function depending on a diversity order; determining a channel estimation error variance function; and determining an SINR being required for a system according to the SINR function and the channel estimation error variance function.

13 Claims, 6 Drawing Sheets

U.S. PATENT DOCUMENTS

| | | | |
|---|---|---|---|
| 7,120,201 B2 | 10/2006 | Huang et al. | |
| 2005/0254592 A1* | 11/2005 | Naguib et al. | 375/267 |
| 2007/0217524 A1 | 9/2007 | Wang et al. | |

FOREIGN PATENT DOCUMENTS

| | | |
|---|---|---|
| KR | 1020080004650 | 1/2008 |

OTHER PUBLICATIONS

Tan, Jun et al., "Multicarrier Delay Diversity Modulation for MIMO Systems," IEEE Transactions on Wireless Communications, vol. 3(5):1756-1763 (2004).

* cited by examiner

METHOD OF CYCLIC DELAY DIVERSITY WITH THE OPTIMAL CYCLIC DELAY VALUE, AND TRANSMITTER PERFORMING THE SAME

RELATED APPLICATIONS

This application is a 35 U.S.C. §371 national stage filing of PCT Application No. PCT/KR2008/003812 filed on Jun. 30, 2008, which claims priority to, and the benefit of, Korean Patent Application No. 10-2007-0113568 filed on Nov. 8, 2007. The contents of the aforementioned applications are hereby incorporated by reference.

TECHNICAL FIELD

The present invention relates to a cyclic delay diversity (CDD) scheme for improving diversity effect of an Orthogonal Frequency Division Multiplexing (OFDM) system, and particularly, to an apparatus and method of determining an optimal cyclic delay value.

This work was supported by the IT R&D program of MIC/IITA. [2006-S-001-02, Development of Adaptive Radio Access and Transmission Technologies for 4th Generation Mobile Communications]

BACKGROUND ART

In general, a Cyclic Delay Diversity (CDD) scheme is adopted for an Orthogonal Frequency Division Multiplexing (OFDM) system to thereby improve frequency selectivity of a channel, so that a coding gain is improved through a channel encoding scheme.

In the CDD scheme, the frequency selectivity of the channel vary according to a cyclic delay value. When a signal is transmitted/received via a multi-path delay channel in the OFDM system using a plurality of transmitting antennas and a signal receiving antenna in the case where it is assumed that a channel estimation is perfectly performed, a cyclic delay value is required to be greater than or equal to a maximum delay spread so as to remove correlation between signals transmitted from each of the plurality of transmitting antennas.

However, in the case where the channel estimation is not perfectly performed, correlation between Signal-to-Interference and Noise Ratio (SINR) gain due to the diversity effect and SINR loss due to channel estimation error exists. Specifically, in the case where Root Mean Square (RMS) delay spread of a channel is relatively great, since the channel has already achieved significant diversity effect required for the performance improvement, additional performance improvement is not highly expected through the CDD scheme. Conversely, in the case where the CDD scheme is adopted, the diversity effect is not achieved, however, performance of channel estimation is likely to be deteriorated, thereby decreasing the entire performance.

DISCLOSURE

Technical Problem

An aspect of the present invention provides an apparatus and method of determining an optimal cyclic delay value, where a cyclic delay value having an optimal Signal-to-Interference and Noise Ratio (SINR) gain is likely to be less than a maximum delay spread.

An aspect of the present invention provides an apparatus and method of a Cyclic Delay Diversity (CDD) with an optimal cyclic delay value.

Technical Solution

According to an aspect of the present invention, there is provided a method of determining an optimal cyclic delay value, which includes: determining a Signal-to-Interference and Noise Ratio (SINR) function depending on a diversity order; determining a channel estimation error variance function; and determining an SINR being required for a system according to the SINR function and the channel estimation error variance function.

According to an aspect of the present invention, there is provided a method of a cyclic delay diversity with an optimal cyclic delay value, which include: providing a transmission signal to a first antenna; acquiring a signal-to-noise/interference ratio (SINR) according to a diversity gain and a channel estimation error, and determining a cyclic delay value where the SINR is minimized; and providing the transmission signal to a second antenna after a delay period determined by the cyclic delay value.

According to an aspect of the present invention, there is provided an apparatus for determining an optimal cyclic delay value, which includes: a Signal-to-Interference and Noise Ratio (SINR) function providing unit for providing an SINR function value according to a diversity order; a channel estimation error variance function providing unit for providing a channel estimation error variance function value; and a cyclic delay value determination unit for calculating an SINR value being required by a system according to the SINR function value and the channel estimation error variance function value to thereby determine the optimal cyclic delay value.

MODE FOR INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
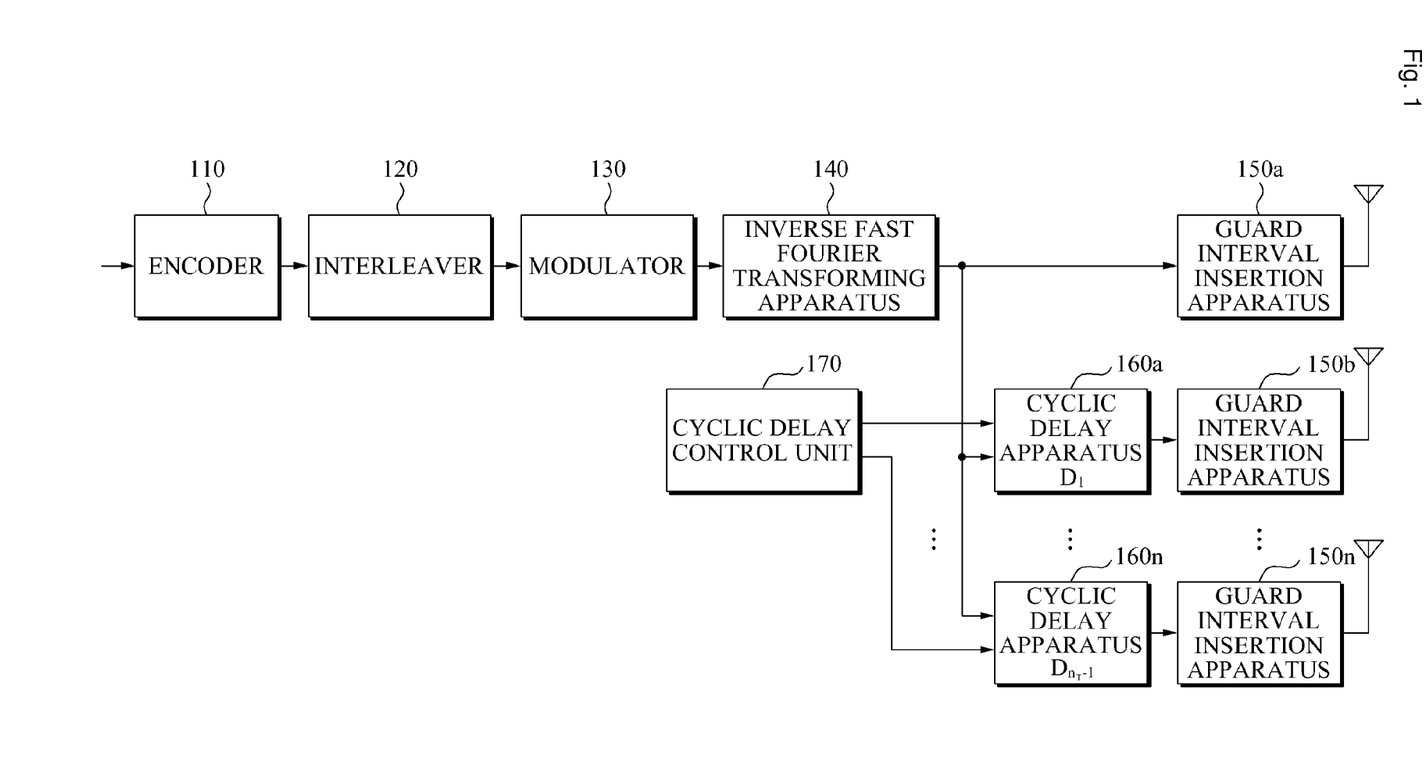
FIG. 1 is a configuration diagram illustrating improved transmitting apparatus having an optimal cyclic delay value according to an exemplary embodiment of the present invention.

FIG. 1 is a configuration diagram illustrating a improved transmitting device having an optimal cyclic delay value according to an exemplary embodiment of the present invention.

Referring to FIG. 1, the transmitting apparatus includes an encoder 110, an interleaver 120, a modulator 130, an inverse fast Fourier transforming apparatus 140, guard interval insertion apparatuses 150a, 150b, and 150n, cyclic delay apparatuses 160a and 160n, and a cyclic delay control unit 170.

A guard interval is inserted in an Orthogonal Frequency Division Multiplexing (OFDM) transmission signal by the guard interval insertion apparatuses 150a, 150b, and 150n, after passing through the encoder 110, the interleaver 120, the modulator 130, and the inverse fast Fourier transforming apparatus 140, and the OFDM transmission signal is transmitted via an antenna.

The diversity transmitting apparatus adapting a Cyclic Delay Diversity (CDD) scheme delays the OFDM transmission signal for a predetermined time period to transmit the delayed signal via multiple antennas.

Specifically, the CDD according to the present exemplary embodiment provides the OFDM transmission signal to a first antenna, and provides the OFDM transmission signal to a second antenna positioned neighboring the first antenna after an optimal cyclic delay period.

The cyclic delay control unit 170 determines an optimal cyclic delay value in a method which will be described in detail below, and provides the determined optimal cyclic delay value to each of the cyclic delay apparatuses 160a and 160n.

Figure 2:
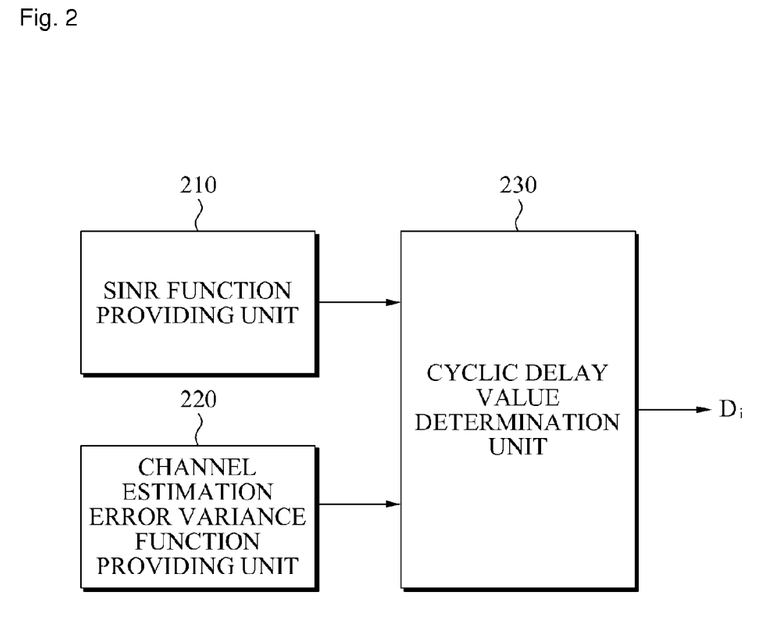
FIG. 2 is a block diagram illustrating a configuration of an apparatus of determining an optimal cyclic delay value according to an exemplary embodiment of the present invention.

FIG. 2 is a block diagram illustrating a configuration of an apparatus of determining an optimal cyclic delay value according to an exemplary embodiment of the present invention.

Referring to FIG. 2, the apparatus of determining the optimal cyclic delay value includes a Signal-to-Interference and Noise Ratio (SINR) function providing unit 210 for providing an SINR function value according to a diversity order, a channel estimation error variance function providing unit 220 for providing a channel estimation error variance function value, and a cyclic delay value determination unit 230 for calculating an SINR value being required by a system according to the SINR function value and the channel estimation error variance function value to thereby determine the optimal cyclic delay value.

Hereinafter, principles of the present invention will be described using equations, and operations performed by the apparatus of determining the optimal cyclic delay value according to the present exemplary embodiment will be described in detail.

First, a diversity order of a CDD method is defined.

In a Single Input Single Output (SISO) system having a single transmitting antenna and a single receiving antenna, in the case of transmitting a transmission signal of 'x' having a mean size of '1' via a single-path fading channel, a reception signal of 'r' may be represented by $$r = hx + z \quad \text{[Equation 1]}$$

where 'h' denotes interference and noise and has a variance of '$\sigma_z^2$'. In this instance, an SINR of the SISO system having a single-path is represented by $$SINR_s = \frac{|h|^2}{\sigma_z^2}. \quad \text{[Equation 2]}$$

Also, a multi-path delay profile channel having L paths may be represented by $$h(t) = \sum_{l=0}^{L-1} p_l h_l \delta(t - lT), \quad \text{[Equation 3]}$$

where 'T' denotes a sample interval, and '$p_l$' denotes a path delay profile of a channel. In this instance, '$h_l$' denotes a complex Gaussian probability distribution, which is assumed to be i.i.d. (independent and identically distributed)

In the case where a size of a fast Fourier transform (FFT) in an OFDM system is '$N_s$', a power delay profile may be expressed as 'P' of (1×$N_s$) vector, which may be represented by $$P = (p_0^2, p_1^2, \ldots, p_{L-1}^2, 0, \ldots, 0) \quad \text{[Equation 4]}$$

where P satisfies a condition of Equation 5 below, and an SINR of a signal received via the multi-path delay profile channel having L paths may be represented by Equation 6 below.

$$\sum_{l=0}^{L-1} p_l^2 = 1 \quad \text{[Equation 5]}$$

$$SINR_m = \frac{\sum_{l=0}^{L-1} p_l^2 |h_l|^2}{\sigma_z^2}. \quad \text{[Equation 6]}$$

In this instance, according to the present exemplary embodiment, a diversity order of M of the multi-path delay profile channel may be represented by $$M = \frac{1/\text{var}\{SINR_m\}}{1/\text{var}\{SINR_s\}} = \frac{\text{var}\{SINR_s\}}{\text{var}\{SINR_m\}}. \quad \text{[Equation 7]}$$

When Equations 2 and 6 are applied to Equation 7, the diversity order of M may be represented by $$M = \frac{\text{var}\{|h|^2\}}{\text{var}\left\{\sum_{l=0}^{L-1} p_l^2 |h_l|^2\right\}} = \frac{1}{\sum_{l=0}^{L-1} p_l^4} = \frac{1}{|p|^2}, \quad \text{[Equation 8]}$$

where the diversity order of M is determined by the power delay profile of 'P'. Also, when the condition of Equation 5 and a Language Multiplier method are used, a maximum value of the diversity order of M becomes 'L'.

A channel of i-th transmitting antenna from among $N_T$ transmitting antennas may be represented, in the similar type to that in Equation 3, by $$h^i(t) = \sum_{l=0}^{L-1} p_l h_l^i \delta(t - lT) \qquad \text{[Equation 9]}$$

$$0 \le i \le n_T - 1.$$

When a channel of $h^i(t)$ is cycled and delayed as much as '$\lambda T$', Equation 9 may be represented by $$h^i(t - \lambda T) = \sum_{l=0}^{L-1} p_l h_l^i \delta(t - (\lambda + l)T). \qquad \text{[Equation 10]}$$

When a cyclic delay value of the i-th transmitting antenna is selected '$D_i = iDT$', a channel of a CDD scheme is represented by $$h_{CDD}(t) = \frac{1}{\sqrt{n_T}} \sum_{i=0}^{n_T-1} h^i(t - iDT). \qquad \text{[Equation 11]}$$

When a power profile of a channel where a discrete time is delayed as much as 'D' may be represented by $$\mathbf{P}_{\langle\langle D \rangle\rangle} = (0, \ldots, 0, p_0^2, \ldots, p_{L-1}^2, 0, \ldots, 0) \qquad \text{[Equation 12]}$$

In this instance, '$P_{CDD}$' of a power profile of '$h_{CDD}$' of a channel generated by the CDD scheme may be represented by $$P_{CDD} = \frac{1}{n_T} \sum_{i=0}^{n_T-1} P_{\langle\langle iD \rangle\rangle}. \qquad \text{[Equation 13]}$$

In this instance, when Equation 8 is utilized, the diversity order of M may be represented by $$M = \frac{1}{|P_{CDD}|^2} = \frac{n_T^2}{\left|\sum_{i=0}^{n_T-1} P_{\langle\langle iD \rangle\rangle}\right|^2}. \qquad \text{[Equation 14]}$$

Referring to Equation 14, the diversity order of M is determined by a number of transmitting antennas of '$n_T$', the power delay profile of the channel of 'P', and a cyclic delay value of D.

Accordingly, even in the case where the number of transmitting antennas and the power delay profile of the channel are fixed, the cyclic delay value of D is selected to have a predetermined value, thereby adjusting the diversity order of M. When D is '0', $n_T$ channels are completely overlapped, so that the same effect as in the case where the number of transmitting antennas is '1' is achieved, and thus, the diversity order is $1/|P|^2$.

Overlapped portions of each channel decrease and the diversity order increases along with an increase in D. When $D \geq L$, a correlation between respective channels is '0', and thus the diversity order is $n_T/|P|^2$. Once $D \geq L$, the diversity order does not increase any more even when D increases.

In addition, $\bar{\tau}$ of a mean excess delay of a channel and $\tau$ of Root Mean Square (RMS) delay spread of a channel may be represented by $$\bar{\tau} = \frac{\sum_{l=0}^{L-1} p_l^2 \cdot lT}{\sum_{l=0}^{L-1} p_l^2} = \sum_{l=0}^{L-1} p_l^2 \cdot lT, \tau = \sqrt{\overline{\tau^2} - (\bar{\tau})^2}. \qquad \text{[Equation 15]}$$

$\overline{\tau^2}$ of a secondary moment of an excess delay in Equation 15 may be represented by $$\overline{\tau^2} = \frac{\sum_{l=0}^{L-1} p_l^2 \cdot (lT)^2}{\sum_{l=0}^{L-1} p_l^2} = \sum_{l=0}^{L-1} p_l^2 \cdot (lT)^2. \qquad \text{[Equation 16]}$$

The RMS delay spread of the channel increases along with an increase in D of the cyclic delay value of the CDD scheme. $\bar{\tau}_{CDD}$ of a mean excess delay of the CDD scheme having $n_T$ transmitting antennas is acquired by utilizing Equations 13 and 15, which may be represented by $$\overline{\tau_{CDD}} = \bar{\tau} + \frac{(n_T - 1)DT}{2}. \qquad \text{[Equation 17]}$$

Also, $\overline{\tau^2}{CDD}$ of an excess delay secondary moment of the CDD scheme is acquired by utilizing Equations 13 and 16, which may be represented by $$\overline{\tau_{CDD}^2} = \overline{\tau^2} + (n_T - 1)DT\bar{\tau} + \frac{(n_T - 1)(2n_T - 1)}{6}(DT)^2. \qquad \text{[Equation 18]}$$

When Equations 17 and 18 are applied to Equation 15, $\tau_{CDD}$ of the RMS delay spread of the CDD scheme is represented by $$\tau_{CDD} = \sqrt{\tau^2 + \frac{(n_T^2 - 1)(DT)^2}{12}}. \qquad \text{[Equation 19]}$$

Referring to Equation 19, it is found that the RMS delay spread of the CDD scheme increases along with increases in $n_T$ and D. Here, as for a specific channel, for example, $P = (1-a)(1, a, a^2, a^3, \ldots)$ of a power delay profile using the CDD scheme having two transmitting antennas, 'a' satisfies $0 < a < 1$, and $P_l^2 = (1-a)a^l$. As a result, a condition of $\Sigma P_l^2 = 1$ can be achieved.

In this instance, the diversity order of M is acquired by utilizing Equation 13, which is represented by $$M = \frac{2(1 + a)}{(1 + a^D)(1 - a)}. \qquad \text{[Equation 20]}$$

Referring to Equation 20, it is found that the diversity order of M increases along with an increase in D of the cyclic delay value.

Figure 3:
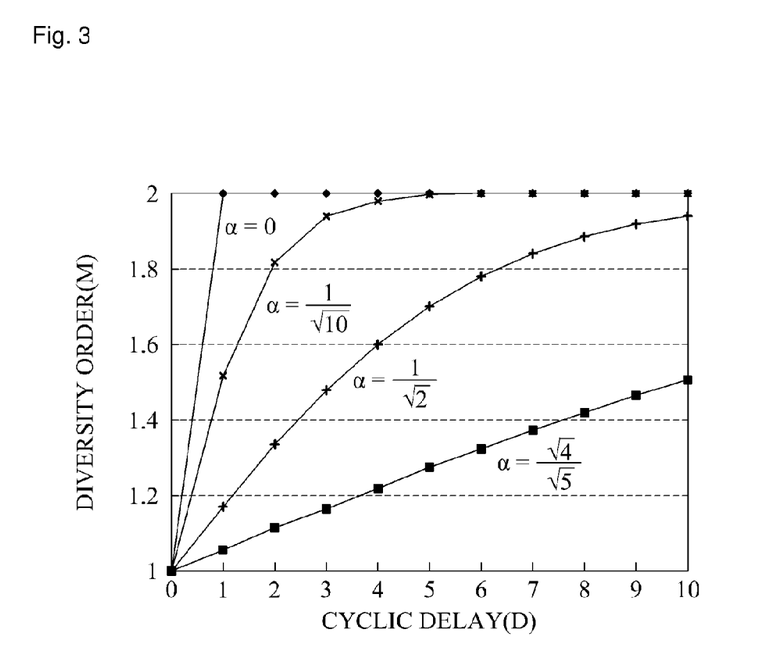
FIG. 3 is a graph illustrating change in a diversity order normalized depending on a cyclic delay value.

FIG. 3 is a graph illustrating change in a diversity order normalized depending on a cyclic delay value.

As illustrated in FIG. 3, the normalized diversity order denotes a value acquired by adjusting in such a manner that a maximum of the diversity order is $n_T$ in the case of $n_T$ transmission antennas. As 'a' approaches '0', the RMS delay spread of the channel becomes smaller, so that the diversity order of M can be maximized even in a relatively small D. Conversely, as 'a' approaches '1', the RMS delay spread of the channel becomes greater, and D required for maximizing the diversity order of M also becomes greater.

When Equations 15, 16, and 19 are utilized, $\tau$ of RMS delay spread acquired when the CDD scheme is applied to a single transmitting antenna and $\tau_{CDD}$ of RMS delay spread acquired when the CDD scheme is applied to two transmitting antennas may be represented, respectively, by $$\tau = \frac{\sqrt{a}}{1-a} T, \tau_{CDD} = T \sqrt{\frac{a}{(1-a)^2} + \frac{D^2}{4}}.$$ [Equation 21]

When the CDD scheme is applied to a communication system, an average of a channel capacity is not changed, however, a variance of a channel becomes less, thereby improving outage performance.

Thus, since the variance of the channel decreases along with an increase in the diversity order represented by Equation 7, outage performance of the communication system can be improved.

Therefore, an SINR required for satisfying a given Frame Error Rate (FER) decreases in monotone along with an increase in the diversity order. The SINR required for satisfying the given FER may be represented by the following Equation 22.

According to the present exemplary embodiment, the SINR function providing unit 210 may provide an SINR function value acquired by Equation 22 as below, which is represented by $$SINR = f(M)$$ [Equation 22]

Figure 4:
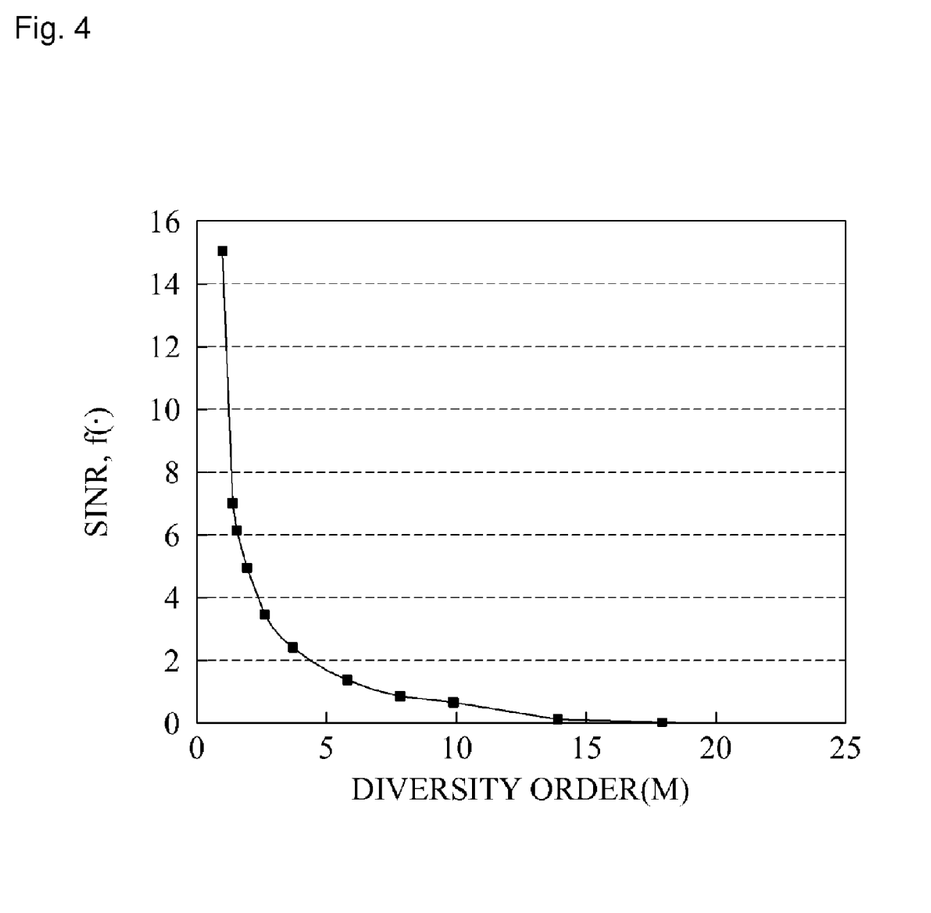
FIG. 4 is a graph illustrating a Signal-to-Interference and Noise Ratio (SINR) depending on a diversity order in the case where a channel estimation is perfectly performed.

FIG. 4 is a graph illustrating an SINR depending on a diversity order in the case where a channel estimation is perfectly performed, which corresponds to $f(\cdot)$ (SINR function) of Equation 22.

In addition, when the diversity order increases by a predetermined level or more, a fading channel is converted into an Additive White Gaussian Noise (AWGN) channel, and thus a diversity gain is not able to increase any more. Also, in the diversity order being a predetermined level or more, the SINR does not decrease. Specifically, $f(\cdot)$ the SINR function decreases in monotone along with an increase in M, and is approximated to an SINR of the AWGN channel starting from M being the predetermined level or more.

When the cyclic delay value increases, the RMS delay spread and the diversity order also increase. As the RMS delay spread increases, frequency selectivity of a channel becomes larger, and channel estimation error occurring in an interpolation process performed between pilot signals used for channel estimation increases. Specifically, the diversity order and the channel estimation error increase along with an increase in the cyclic delay value.

When a Cyclic Prefix (CP) is removed from a receiver of the OFDM system and the FFT is performed, a symbol of a k-th subcarrier from an n-th symbol time may be represented by $$Y[n,k] = H[n,k] X[n,k] + Z[n,k]$$ [Equation 23]

where H[n,k] denotes a frequency response of a channel in the k-th subcarrier of the n-th symbol time, and Z[n,k] is generated by interference and noise and is approximated to an AWGN having a variance of $\sigma_z^2$. For convenience of description, [n,k] will be hereinafter omitted.

In this instance, a channel estimation coefficient of $\hat{H}$ may be represented by $$\hat{H} = H + \Delta H$$ [Equation 24]

Referring to Equation 24, when it is assumed $E\{\Delta H\}=0$ in the case where $\Delta H$ indicates channel estimation error, a Mean Square Error (MSE) of the channel estimation becomes a variance of $\Delta H$.

It may be assumed that $\sigma_z^2$ is a function of $\tau_{CDD}$, which is a function increasing in monotone. Accordingly, a relationship between $\tau_{CDD}$ and $\sigma_z^2$ may be represented by $$\sigma_\Delta^2 = g(\tau_{CDD})$$ [Equation 25]

Figure 5:
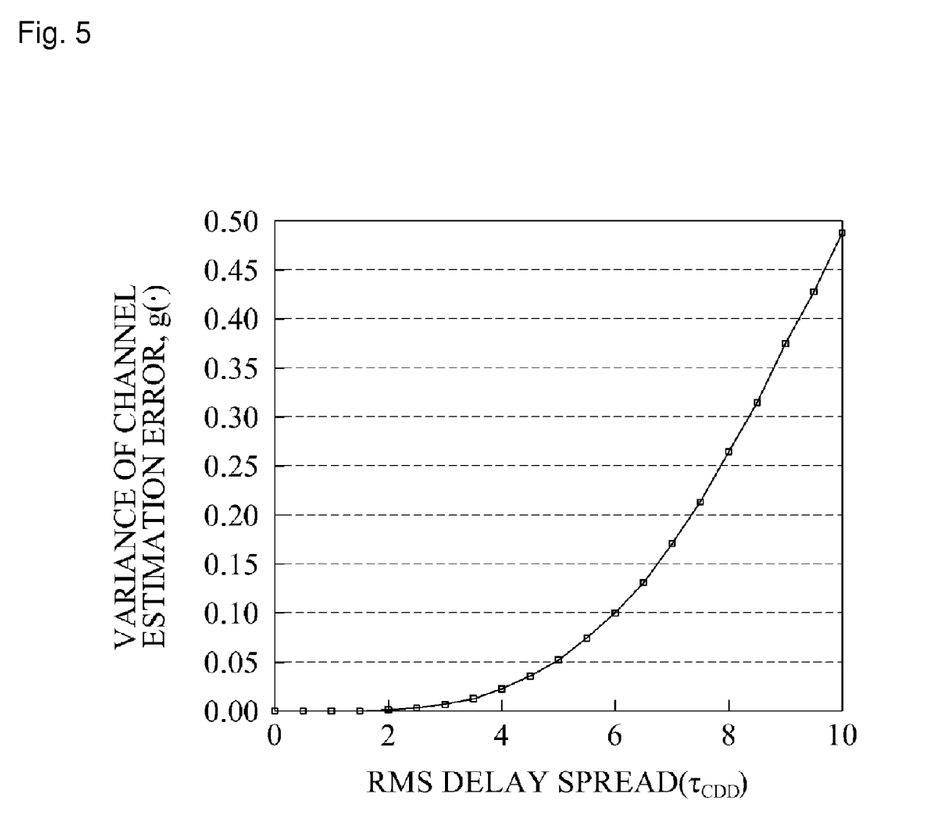
FIG. 5 is a graph illustrating a relation between variance of channel estimation error and Root Mean Square (RMS) delay spread.

FIG. 5 is a graph illustrating a relation between a function of $g(\cdot)$ of a variance of channel estimation error of $\sigma_z^2$, and the Root Mean Square (RMS) delay spread of $\tau_{CDD}$.

According to the present exemplary embodiment, the channel estimation error variance function providing unit 220 may provide a channel estimation error variance function value acquired by utilizing Equation 25.

In this instance, when Y of a reception signal passes through a Maximal Ratio Combining (MRC) equalizer, a signal of $\hat{X}$ is acquired, which is represented by $$\hat{X} = \hat{H}^* Y = (H^* + \Delta H^*)(HX + Z) = |H|^2 X + H^* Z + \Delta H^* H X + \Delta H^* Z$$ [Equation 26]

where $|H|^2 X$ may denote a signal, and $H^*Z + \Delta H^* H X + \Delta H^* Z$ may denote interference and noise. Accordingly, when it is assumed that a power of the transmission signal is '1', an SINR in the case where the channel estimation error of $\Delta H$ exists may be represented by $$SINR = \frac{|H|^2}{\sigma_Z^2 + \sigma_\Delta^2 + \frac{\sigma_Z^2 \sigma_\Delta^2}{|H|^2}}.$$ [Equation 27]

When the channel estimation error does not exist, $SINR = |H|^2/\sigma_z^2$ is achieved from $\sigma_\Delta^2 = 0$. Also $SINR < |H|^2/\sigma_z^2$ is achieved from $\sigma_\Delta^2 \neq 0$. When it is assumed $$\frac{\sigma_Z^2 \sigma_\Delta^2}{|H|^2} << \sigma_Z^2 + \sigma_\Delta^2,$$

Equation 27 may be approximated as in Equation 28 as below, which may be represented by $$SINR = \frac{|H|^2}{\sigma_Z^2 + \sigma_\Delta^2}$$ [Equation 28]

Also, $\overline{SINR}$ that is, an average of an SINR in the case of $E\{|H|^2\}=1$ may be represented by $$\overline{SINR} = E_H\{SINR\} \quad \text{[Equation 29]}$$
$$= \frac{E_H\{|H|^2\}}{\sigma_Z^2 + \sigma_\Delta^2}$$
$$= \frac{1/\sigma_Z^2}{1 + \sigma_\Delta^2/\sigma_Z^2}$$
$$= \frac{SINR_{req}}{1 + \sigma_\Delta^2 SINR_{req}},$$

where $SINR_{req}$ denotes an SINR required in a communication system for the purpose of satisfying the given FER. When effects of the channel estimation error do not exist, $SINR_{req} = f(M)$ for satisfying the given FER may be achieved from $\overline{SINR} = f(M)$. Conversely, when effects of the channel estimation error exist, $SINR_{req}$ for satisfying $\overline{SINR} = f(M)$ is required to be acquired.

In this instance, $SINR_{req}$ is acquired by utilizing Equations 22, 25, and 28, which may be represented by $$SINR_{req} = \frac{f(M)}{1 - \sigma_\Delta^2 f(M)} = \frac{f(M)}{1 - g(\tau_{CDD}) f(M)}. \quad \text{[Equation 30]}$$

According to the present exemplary embodiment, the cyclic delay value determination unit 230 calculates an SINR required in the communication system by using Equation 30, thereby determining an optimal cyclic delay value.

In addition, as a cyclic delay value of D increases, an SINR performance in view of the diversity effect is improved, and an SINR performance in view of the channel estimation is deteriorated. Specifically, correlation between the diversity effect and the channel estimation error is achieved. Accordingly, the cyclic delay value of D for minimizing the $SINR_{req}$ required by considering this correlation is defined as an optimal cyclic delay value of $D_{opt}$.

According to the present exemplary embodiment, the cyclic delay value determination unit 230 determines a cyclic delay value for minimizing the $SINR_{req}$ required based on the correlation between the diversity effect and the channel estimation error as an optimal cyclic delay value.

As can be seen from Equations 14 and 19, since the diversity order and the RMS delay spread are a function of the cyclic delay value, $f(M)$ and $g(\tau_{CDD})$ vary according to the cyclic delay value.

Thus, $D_{opt}$, that is, an optimal cyclic delay value for minimizing the $SINR_{req}$ may be acquired by utilizing Equation 30, and $f(M)$ and $g(\tau_{CDD})$ are generally generated in advance during this process to thereby store the generated $f(M)$ and $g(\tau_{CDD})$ in a table.

Also, according to the present exemplary embodiment, the SINR function depending on the diversity order sequentially increases a cyclic delay value, and calculates a diversity order with respect to each of the cyclic delay values to thereby determine an optimal cyclic delay value.

Also, according to the present exemplary embodiment, the channel estimation error variance function sequentially increases a cyclic delay value, and calculates a delay spread value with respect to each of the cyclic delay values to thereby determine an optimal cyclic delay value.

In order to show efficiency of the present invention for determining an optimal cyclic delay value in the CDD scheme, a simulation is performed under a condition as shown in Table 1 below. In this instance, a power delay profile is defined as $P = (1-a)(1, a, a^2, a^3, \ldots)$.

TABLE 1

| Parameter | Value |
|---|---|
| Power delay profile | $P = (1 - a)(1, a, a^2, a^3, \ldots)$ |
| Modulation | BPSK |
| size of FFT | 256 |
| FER | $10^{-2}$ |
| Channel encoding scheme | Convolutional Code (constraint length = 7, code rate = ⅓) |
| Channel estimation | linear interpolation (cycle = 8) |

In the case where the channel estimation is perfectly performed, an SINR for satisfying the given FER($=10^{-2}$) decreases along with an increase in the diversity order. A function of $f(\cdot)$ of Equation 24 decreasing in monotone representing the relation between the SINR and the diversity order as described above may be shown in FIG. 4.

Also, the RMS delay spread increases along with an increase in D, and thus, a variance of the channel estimation error accordingly increases. As illustrated in FIG. 5, a function increases in monotone in the graph showing a relation between the RMS delay spread and the variance of channel estimation error. The function of the graph shown in FIG. 5 corresponds to $g(\cdot)$ of Equation 25.

Also, both SINR improvement occurring due to the increase in the diversity order of M and SINR loss occurring due to the increase in the variance of the channel estimation error of $\sigma_\Delta^2$ are induced by the increase in D. Results of a simulation performed based on the diversity effect and the channel estimation error are shown in FIG. 6.

Figure 6:
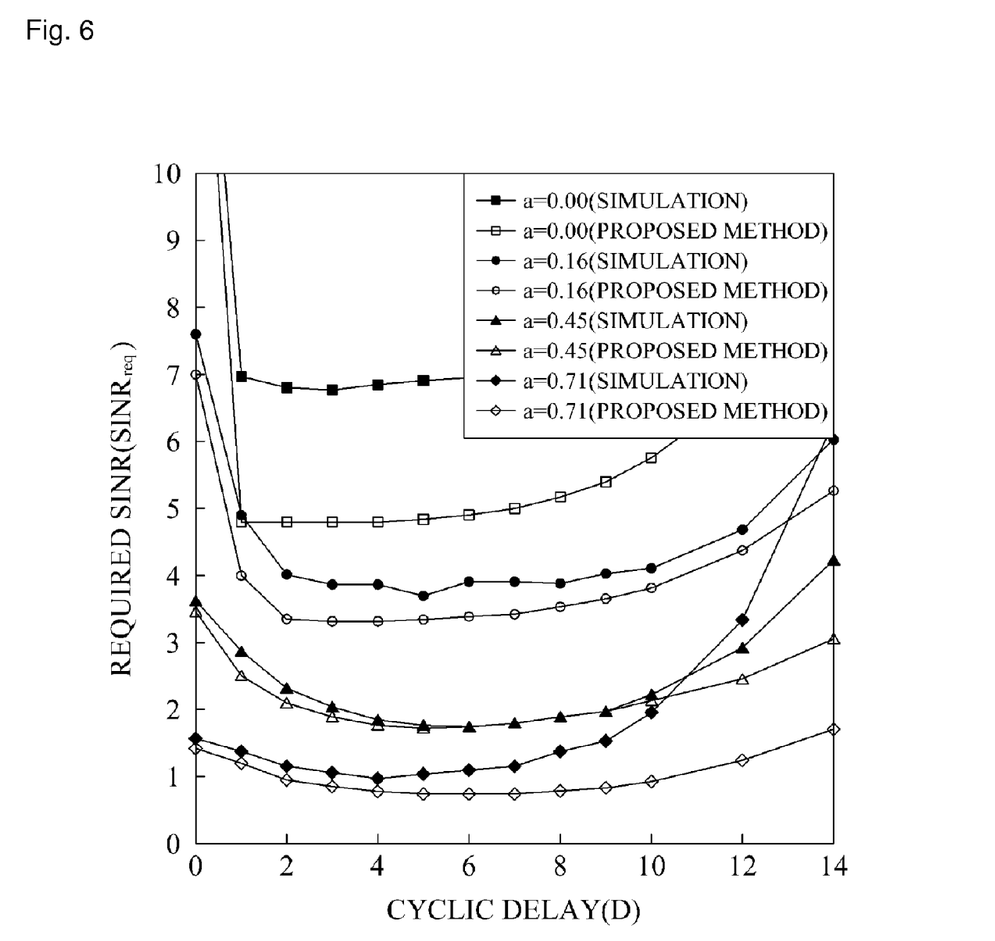
FIG. 6 is a graph illustrating a comparison between an SINR acquired by calculating a Cyclic Delay Diversity (CDD) through a simulation and an SINR acquired by calculating the CDD through a method of determining an optimal cyclic delay value according to an exemplary embodiment of the present invention.

Referring to FIG. 6, it is found that an $SINR_{req}$ satisfying a specific FER decreases due to the diversity effect along with the increase in D, and then increases due to the channel estimation error.

Also, according to the present exemplary embodiment, the $SINR_{req}$ may be calculated by utilizing Equations 22, 25, and 30. When it is assumed that a channel estimation is perfectly performed, a table with respect to the function of $f(M)$ shown in Equation 22 may be acquired using an arbitrary simulation.

Also, when a channel estimation is performed in a given channel through a predetermined method, a table with respect to a function of $g(\tau_{CDD})$ may be acquired. Then, when $f(M)$ and $g(\tau_{CDD})$ are applied to Equation 30, $\widehat{SINR}_{req}$ calculated according to the present exemplary embodiment may be acquired.

The $\widehat{SINR}_{req}$ may be shown in FIG. 6.

As described above, the optimal cyclic delay value of $\widehat{D}_{opt}$ may be acquired through the above arbitrary simulation results. Also, the optimal cyclic delay value of $\widehat{D}_{opt}$ may be acquired even using $\widehat{SINR}_{req}$.

Table 2 below shows $D_{opt}$ and $\widehat{D}_{opt}$ with respect to the RMS delay spread of $\tau$ (Equation 21) of the given channel.

TABLE 2

| | Cyclic delay value (D) | | SINR | | |
|---|---|---|---|---|---|
| $\tau$ | $D_{opt}$ | $\widehat{D}_{opt}$ | $SINR_{opt}$ | $\widehat{SINR}_{opt}$ | error |
| 0.00 | 3 | 1 | 6.75 | 6.95 | 0.19 |
| 0.47 | 5 | 3 | 3.70 | 3.87 | 0.17 |
| 0.82 | 5 | 4 | 2.50 | 2.62 | 0.12 |
| 1.21 | 6 | 5 | 1.74 | 1.79 | 0.05 |

TABLE 2-continued

| τ | Cyclic delay value (D) | | SINR | | |
|---|---|---|---|---|---|
| | $D_{opt}$ | $\widehat{D}_{opt}$ | $SINR_{opt}$ | $\widehat{SINR}_{opt}$ | error |
| 1.80 | 5 | 5 | 1.26 | 1.26 | 0.00 |
| 2.87 | 4 | 5 | 0.99 | 1.04 | 0.05 |
| 3.90 | 4 | 4 | 1.12 | 1.12 | 0.00 |
| 4.92 | 1 | 4 | 1.43 | 1.68 | 0.25 |
| 6.95 | 0 | 0 | 2.56 | 2.56 | 0.00 |

Also, as shown in Table 2, an $SINR_{req}$, that is, an SINR required when applying $D_{opt}$ and a $\widehat{SINR}_{opt}$, that is, an SINR required when applying $\widehat{D}_{opt}$ are compared to each other. Referring to Table 2, it is found that $|SINR_{opt} - \widehat{SINR}_{opt}|$, that is, an error of the SINR is significantly smaller. Specifically, when $\widehat{D}_{opt}$ minimizing $\widehat{SINR}_{opt}$ estimated by utilizing Equation 30 is selected, the performance of the CDD system may be optimized.

Figure 7:
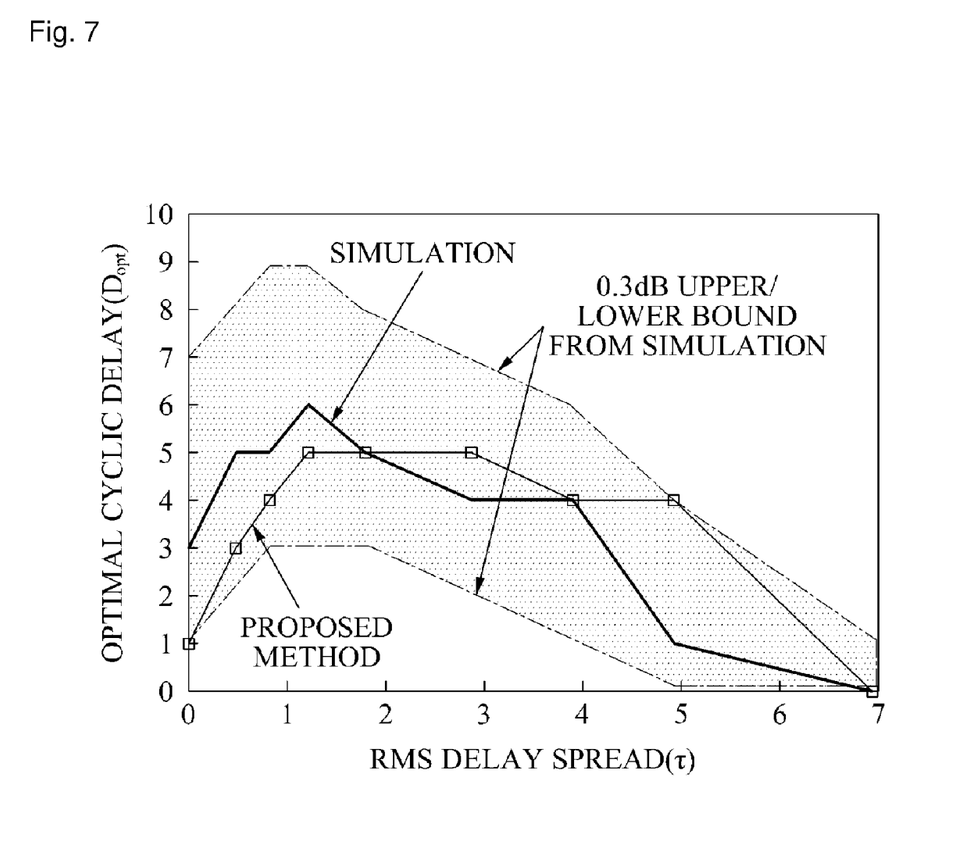
FIG. 7 is a graph illustrating a comparison between results of a simulation and a method of determining an optimal cyclic delay value according to an exemplary embodiment of the present invention.

FIG. 7 illustrates a relation between the RMS delay spread of τ, and the optimal cyclic delay value of $D_{opt}$.

It is found that the optimal cyclic delay value is relatively smaller in comparison with a size of a FFT under conditions of the above-described simulation.

Also, the optimal cyclic delay value depending on the RMS delay spread increases until reaching a predetermined value, and then decreases. This is because, effects of performance deterioration occurring due to the channel estimation error are relatively larger in comparison with additional diversity effects acquired when the RMS delay spread is more than a predetermined value.

A shaded region in FIG. 7 represents a range of the cyclic delay value of D, which allows $SINR_{req}$ to be within an error of ±0.3 dB. It is found that $\widehat{D}_{opt}$ calculated according to the present exemplary embodiment is within the range of the cyclic delay value.

The method of determining an optimal cyclic delay value according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

As described above, according to the present invention, an optimal cyclic delay value may be acquired when the CDD scheme is applied to the OFDM system.

According to the present invention, frequency selectivity of the channel increase, when the CDD scheme is applied to the OFDM system. In a CDD scheme according to a conventional art, it is assumed that the cyclic delay value is merely greater than the maximum delay spread of the channel so that the correlation between signals transmitted from each of the transmitting antennas is minimized to improve the transmitting/receiving performance in a state where the channel estimation is perfectly performed. However, when channel estimation is not perfectly performed, the correlation between an SINR gain due to the diversity effect and the SINR loss due to the channel estimation error exists. Specifically, in the case where the RMS delay spread of a channel is relatively great, since the channel has already achieved significant diversity effect required for the performance improvement, additional performance improvement is not highly expected through the CDD scheme. Conversely, in the case where the CDD scheme is adopted, the diversity effect is not achieved, however, performance of channel estimation is likely to be deteriorated, thereby decreasing the entire performance.

According to the present invention, a frame error rate (FER) performance in the given channel environment may be most improved when the optimal cyclic delay value is applied to the CDD scheme after being acquired by the method according to the present invention, in the case where the correlation between the diversity effect and the channel estimation error exists.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of a cyclic delay diversity with an optimal cyclic delay value, the method comprising:
    providing a transmission signal to a first antenna;
    acquiring a signal-to-noise/interference ratio (SINR) according to a diversity gain and a channel estimation error, and determining a cyclic delay value where the SINR is minimized; and
    providing the transmission signal to a second antenna after a delay period determined by the cyclic delay value,
    wherein the delay period is determined based on the diversity gain and the channel estimation error.

2. A method of a cyclic delay diversity with an optimal cyclic delay value, the method comprising:
    providing a transmission signal to a first antenna;
    acquiring a signal-to-noise/interference ratio (SINR) according to a diversity gain and a channel estimation error, and determining a cyclic delay value where the SINR is minimized; and
    providing the transmission signal to a second antenna after a delay period determined by the cyclic delay value,
    wherein the determining a cyclic delay value comprises:
    determining a Signal-to-Interference and Noise Ratio (SINR) function depending on a diversity order;
    determining a channel estimation error variance function; and
    determining an SINR being required for a system according to the SINR function and the channel estimation error variance function.

3. The method of claim 2, wherein the determining of the SINR function sequentially increases a cyclic delay value and calculates a diversity order for each cyclic delay value to thereby determine the SINR function according to the diversity order.

4. The method of claim 2, wherein the SINR function according to the diversity order is determined based on a value being measured and stored in advance.

5. The method of claim 2, wherein the determining of the channel estimation error variance function sequentially increases a cyclic delay value and calculates a delay spread value for each cyclic delay value to thereby determine the channel estimation error variance function.

6. The method of claim 2, wherein the channel estimation error variance function is determined based on a value being measured and stored in advance.

7. The method of claim 2, wherein the SINR being required by the system is acquired by dividing the SINR function by "1-(the SINR×the channel estimation error variance function)".

8. The method of claim 2, wherein the optimal cyclic delay value is an optimal cyclic delay value acquired when the SINR being required by the system is minimized.

9. An apparatus of a cyclic delay diversity with an optimal cyclic delay value, the apparatus comprising:
    an inverse fast Fourier transforming unit providing a transmission signal to a first antenna;
    a cyclic delay control unit acquiring a signal-to-noise/interference ratio (SINR) according to a diversity gain and a channel estimation error, and determining a cyclic delay value where the SINR is minimized; and
    a cyclic delay unit providing the transmission signal to a second antenna after a delay period determined by the cyclic delay value,
    wherein the delay period is determined based on the diversity gain and the channel estimation error.

10. An apparatus of a cyclic delay diversity with an optimal cyclic delay value, the apparatus comprising:
    an inverse fast Fourier transforming unit providing a transmission signal to a first antenna:
    a cyclic delay control unit acquiring a signal-to-noise/interference ratio (SINR) according to a diversity gain and a channel estimation error, and determining a cyclic delay value where the SINR is minimized; and
    a cyclic delay unit providing the transmission signal to a second antenna after a delay period determined by the cyclic delay value,
    wherein the cyclic delay control unit comprises:
    a Signal-to-Interference and Noise Ratio (SINR) function providing unit for providing an SINR function value according to a diversity order;
    a channel estimation error variance function providing unit for providing a channel estimation error variance function value; and
    a cyclic delay value determination unit for calculating an SINR value being required by a system according to the SINR function value and the channel estimation error variance function value to thereby determine the optimal cyclic delay value.

11. The apparatus of claim 10, wherein the SINR function providing unit includes a table being generated by sequentially increasing a cyclic delay value to calculate a diversity order for each cyclic delay value in advance.

12. The apparatus of claim 10, wherein the channel estimation error variance function providing unit includes a table being generated by sequentially increasing a cyclic delay value to calculate a delay spread value for each cyclic delay value in advance.

13. The apparatus of claim 10, wherein the cyclic delay value determination unit determines a cyclic delay value where the SINR being required by the system is minimized as the optimal cyclic delay value.

* * * * *